United States Patent [19]

Ikeuchi

[11] Patent Number: 5,435,725
[45] Date of Patent: Jul. 25, 1995

[54] SYSTEM FOR SIMULATING A FLYING VEHICLE

[75] Inventor: Masayuki Ikeuchi, Yokohama, Japan

[73] Assignee: Kabushiki Kaisha Toshiba, Kawasaki, Japan

[21] Appl. No.: 75,512

[22] PCT Filed: Oct. 16, 1992

[86] PCT No.: PCT/JP92/01346

§ 371 Date: Jun. 17, 1993

§ 102(e) Date: Jun. 17, 1993

[30] Foreign Application Priority Data

Oct. 18, 1991 [JP] Japan ................................. 3-271310

[51] Int. Cl.⁶ ...................................................... G09B 9/08
[52] U.S. Cl. ........................................ 434/30; 434/34; 434/43; 364/578
[58] Field of Search ............................ 434/30, 33-35, 434/38, 43, 45, 59, 62, 69, 72, 118, 219, 220, 365, 372; 364/578; 273/433, 434, 454, DIG. 28; 395/100, 118, 152, 155, 375, 927

[56] References Cited

U.S. PATENT DOCUMENTS

| | | | |
|---|---|---|---|
| 4,280,285 | 7/1981 | Haas | 434/30 |
| 4,710,128 | 12/1987 | Wachamuth et al. | 434/30 X |
| 4,845,645 | 7/1989 | Martin et al. | 434/372 X |
| 4,979,137 | 12/1990 | Gerstenfeld et al. | 364/578 |
| 5,017,141 | 5/1991 | Relf et al. | 434/30 X |
| 5,084,824 | 1/1992 | Lam et al. | 364/578 X |
| 5,092,780 | 3/1992 | Vlach | 364/578 X |
| 5,123,088 | 6/1992 | Kasahara et al. | 434/220 X |
| 5,240,419 | 8/1993 | deGyarfas | 434/118 X |
| 5,265,040 | 11/1993 | Saji et al. | 364/578 |

FOREIGN PATENT DOCUMENTS 0096983 4/1991 Japan ..................................... 434/72

Primary Examiner—Joe H. Cheng
Attorney, Agent, or Firm—Oblon, Spivak, McClelland, Maier & Neustadt

[57] ABSTRACT

The present system sets, as numeral information, the characteristic data of a space navigation vehicle and characteristic data of a circumstance situation and sets action setting condition information of the space navigation vehicle with the use of a nonprogramming language containing symbols, and computes, based on the characteristic data and action condition setting information, circumstance data in a circumstance generation unit which are actual action variables necessary for maneuver operation, and performs operation maneuver simulation in a simulator library on the basis of the circumstance data, whereby the characteristic data and action setting condition information can achieve substantially the same function as in the case of the system modification and it is possible to compute the circumstance data under various action setting conditions.

10 Claims, 3 Drawing Sheets

SYSTEM FOR SIMULATING A FLYING VEHICLE

BACKGROUND OF THE INVENTION

1. Field of the Invention

The present invention relates to a flying vehicle simulation system for simulating maneuvering operations of flying vehicles, such as aircraft and space navigation vehicles including artificial satellites.

2. Discussion of the Related Art

With the growing demand for communications in the field of present-day space development, a plurality of space navigation vehicles, such as geostationary satellites and artificial satellites under a rendezvous maneuvering operation employ a series of various maneuvering operations, such as their own independent orbit-and-attitude control, while maintaining a specific relation among them.

For future space development, there is an urgent need to develop a flying vehicle simulation system for experimentally simulating the maneuvering operations of a plurality of space navigation vehicles so as to achieve multi-function and very accurate maneuvering operations of these space navigation vehicles. From the standpoint of stable and safe operation, it is necessary to design the vehicle simulation system such that it can simulate the maneuvering operations of a plurality of space navigation vehicles, while maintaining their relative relation, once their operation conditions have been satisfied.

If the aforementioned simulation system is so configured that it can independently simulate the maneuvering operations of these space navigation vehicles one at a time, then their maneuvering operation conditions, such as their circumstances and maneuvering operation information, are different from vehicle to vehicle and it is also difficult to define the maneuvering operation simulation of the respective space navigation vehicles in a sequential time division fashion. Therefore, a problem arises therefrom because an enormous amount of storage information must correspond to the maneuvering operation conditions of the respective space navigation vehicles. For this reason, the simulation system needs a very large capacity data base for storing such an enormous amount of storage information and the system is therefore very cumbersome to operate.

As a means for realizing a high degree of maneuvering operation simulation, it is possible for a user (operator) to perform a system modification in accordance with the states of maneuvering operations. This presents problems, such as the maintaining of information for performing the system modification, verification of the system accompanied by its modification and cumbersome operations of a new system, that is, problems corresponding to the states of maneuvering operations each time.

Such a situation is also true of the case where any specific maneuvering operation is simulated using the guidance of, for example, a plurality of aircraft one at a time.

The object of the present invention is to provide a flying vehicle simulation system which is simpler in configuration and operation and can achieve a high degree of maneuvering operation simulation.

SUMMARY OF THE INVENTION

It is accordingly an object of the present invention to provide a flying vehicle simulation system comprising setting means for setting, as numerical information, characteristic data of the flying vehicle and characteristic data of a circumstance situation under which the flying vehicle is maneuvered, actual action variable computing means for computing actual action variables for the flying vehicle on the basis of the characteristic data and action setting condition information set by the setting means, and simulator means for simulating the maneuvering operation of the flying vehicle on the basis of the actual action variables determined by the actual action variable computing means.

Stated another way, the flying vehicle simulation system of the present invention performs maneuvering operation simulation by actual action variables computed in accordance with the characteristic data of the numerical information and action setting condition information set by a nonprogramming language containing symbols. By merely variably setting, as storage data, the characteristic data and action setting information it is possible to achieve substantially the same function as in the case of the system modification and to perform maneuvering operation simulation while maintaining accurate functioning of the flying vehicle.

BEST MODE FOR CARRYING OUT THE INVENTION

An embodiment of the present invention will be explained below with reference to the accompanying drawings.

Figure 1:
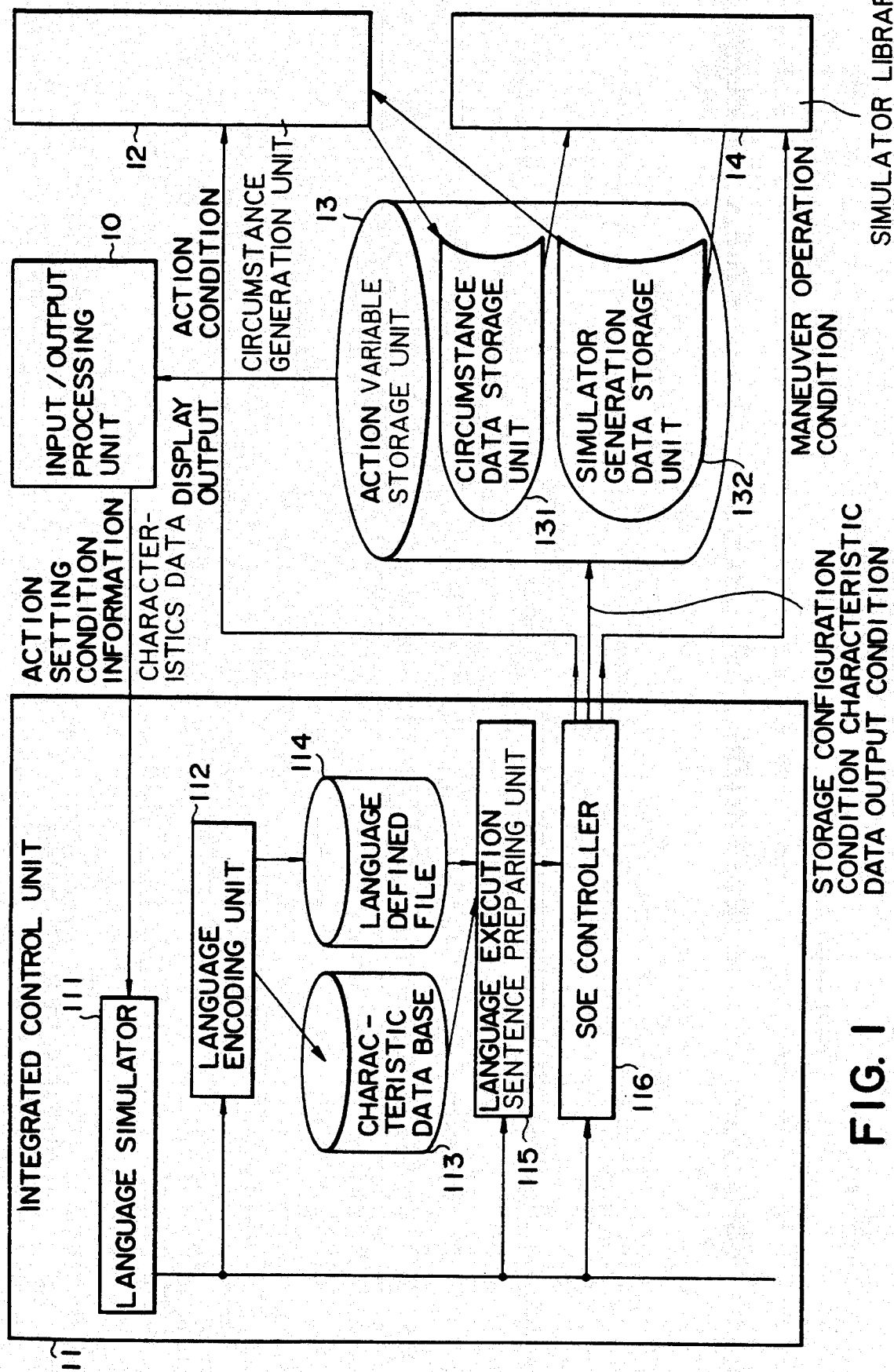
FIG. 1 is a block diagram showing a flying vehicle simulation system according to an embodiment of the present invention.

FIG. 1 shows a flying vehicle simulation system according to one embodiment of the present invention. In FIG. 1, reference numeral 10 shows an input/output processing unit which is freely operable. An integrated control unit 11 is connected to the output terminal of the input/output processing unit 10. The integrated control unit 11 comprises a language simulator 111 for a symbol-containing nonprogramming language called an SOE (sequence of events), a language-based sentence encoding unit 112, a characteristic data base 113, a language-defined file 114, a language execution sentence preparing unit 115 and an SOE (sequence of events) controller 116. In other words, the language simulator 111 defines system operation using symbol-containing nonprogramming language and provides a nonprogramming language-based sentence (action setting condition information) which is output from the input/output processing unit 10 to be transformed, by the language-based sentence encoding unit (action setting condition information) based on the language defined file 114 understandable by the space navigation simulation system.

The action setting condition information contains an action condition, storage configuration condition, maneuvering operation condition, and output condition. Of these, the action condition is a condition for setting a surrounding situation, such as the number of space navigation vehicles which are objects to be simulated, number of ground stations, and the manner of identifying a celestial object. The storage configuration condition is a condition for setting a configuration for storing action variables calculated by the action condition. The operation maneuvering condition is a condition for setting the method for maneuvering the space navigation vehicle, control timing on an orbit, amounts of control, etc. The output condition is a condition for setting an output for displaying a result of simulation including, for example, an instruction of whether a display image on a display section (see FIG. 2) 15 of the input/output processing unit 10 (as will be set out below) is output as a pattern form or a graph.

The characteristic data base 113 stores, as numeral information, data input from the input/output processing unit 10, that is, characteristic data representing the weight, area, etc., of the space navigation vehicle necessary for a maneuvering operation, and characteristic data representing the circumstance situations of the celestial object. The language execution sentence preparing unit 115 delivers an output to the SOE controller 116 on the basis of the output of the characteristic data base 113 and defined file of the language defined file 114.

A circumstance generating unit 12 is connected to the output terminal of SOE controller 116 in the integrated control unit 11. An action variable storage unit 13 is connected to the output terminal of the circumstance generating unit 12. The circumstance generating unit 12 time-sequentially calculates, based on the action condition from the SOE controller 116, circumstance items (circumstance data), that is, the orbit, position and velocity, for instance, of the space navigation vehicle as the object to be simulated, as well as actual action variables on the circumstance situations, such as the position of the celestial object, and delivers an output to the action variable storage unit 13.

The action variable storage unit 13 comprises a circumstance data storage unit 131 for storing circumstance data calculated by the circumstance generation unit 12 and a simulation generation data storage unit 132 storing simulation generation data and operatively controlled in accordance with the storage configuration condition of the SOE controller 116. The action variable storage unit 13 has its circumstance data storage unit 131 connected to a simulation library 14 and its simulation generation data storage unit 132 to the circumstance generation unit 12. The respective output terminals of the circumstance data storage unit 131 and simulation generation data storage unit 132 are connected to the input terminal for the input/output processing unit 10.

The input terminal of the simulation library 14 is connected to the output terminal of the SOE controller 116. The simulator library has its output terminal connected to the simulation generation data storage unit 132 and, upon receipt of the circumstance condition from the SOE controller 116, allows operational maneuvering of the space navigation vehicle to be simulated based on the circumstance data stored in the action variable storage section 13 and delivers an output to the simulator generation data storage unit 132 in the action variable storage unit 13 where it is stored. The simulation generation data storage unit 132 delivers a result of simulation by the simulator library 14 corresponding to the output condition to the input/output processing unit 10.

Figure 2:
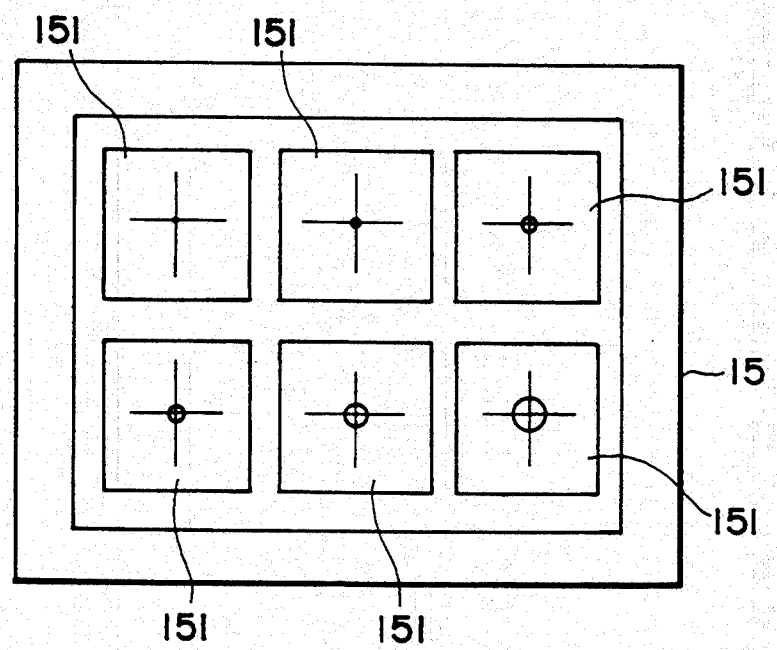
FIG. 2 is a front view showing a display section of an input/output processing unit in FIG. 2.

An explanation will be given below of the display section 15 in the aforementioned input/output processing unit 10. A plurality of windows 151 are provided at the display section 15 as shown in FIG. 2. A result of simulation, such as the flying situation, etc., of the space navigation vehicles simulated by the simulator library 14 in their maneuvering operation is displayed on a plurality of windows 151 in a correlated relation. In the case where the flying situation, etc., of the vehicles is to be displayed as images on the respective windows 151 for instance, the images are displayed at different magnifications. As a result, the operator can accurately grasp the maneuvering courses of the space navigation vehicles under a flying situation by sequentially viewing images on the plurality of windows of the display section 15.

Further, a graph-containing table selectively representing a result of simulation is displayed as a display image by the setting of the aforementioned output condition.

Figure 3:
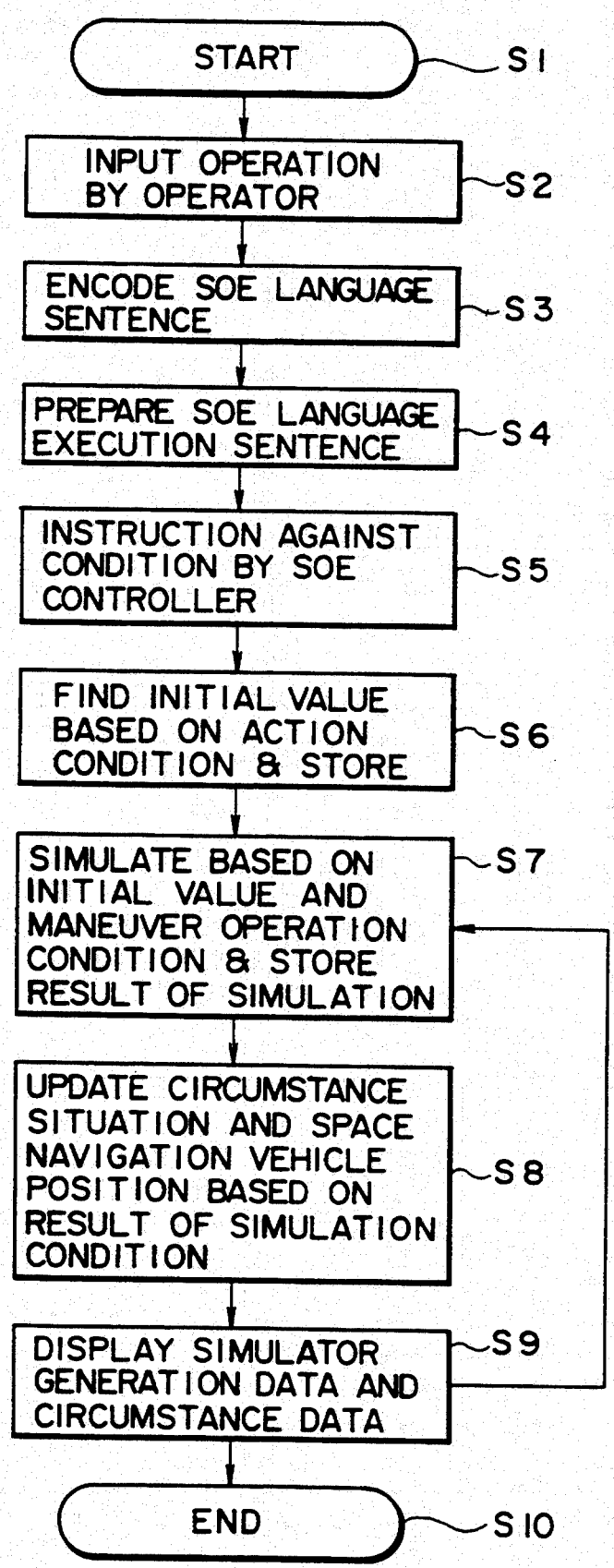
FIG. 3 is a flow chart for explaining the operation of the system in FIG. 1.

In the aforementioned arrangement, when the maneuvering operations of the space navigation vehicles are to be simulated, the user (operator) initiates an edit function as shown in FIG. 3 and, through the operation of the input/output processing unit 10, inputs as numerical information, characteristic data of the space navigation vehicle and characteristic data representing the circumstance situations of the celestial object, etc., and inputs the action setting condition information (action condition, storage configuration condition, operation maneuvering condition and output condition) with nonprogramming language (steps S1 and S2). At step S3, the input characteristic data and action setting condition information of the nonprogramming language are input to the language simulator 111 in the integrated control unit 11 and, of those inputted items, the nonprogramming language is encoded by the language sentence encoding unit 112 and filed in the language defined file 114, while, on the other hand, the characteristic data is stored in the characteristic data base 113.

At step S4, an end-of-input signal is output from the input/output processing unit 10 to the integrated control unit 11. The integrated control unit 11 has its language execution sentence preparing unit 115 operated, compiles the action setting condition information and characteristic data filed in the language defined file 114, prepares an SOE language sentence and allows an output to be delivered to the SOE controller 116.

At step S5, the SOE controller 116 delivers the action condition and characteristic data to the circumstance generation unit 12 and delivers the storage configuration condition to the action variable storage unit 13, while, at the same time, the SOE controller 116 supplies the operation condition to the simulator library 14. Here the circumstance generation unit 12 calculates, based on the input action condition, an initial value of circumstance data necessary to the operational maneuvering simulation on the position, velocity, orbit, etc., of the space navigation vehicles as well as the position of the celestial object, and delivers an output to the circumstance data storage unit 131 of the action variable storage section 13 for storage (step S6).

At step S7, the simulator library 14 reads out an initial value of the circumstance data stored in the circumstance data storage unit 131, simulates a given maneuvering operation based on the operation condition and delivers its simulation generation data to the simulator generation data storage unit 132 of the action variable storage unit 13 for storage. Then at step S8 the circumstance generating unit 12 reads out the circumstance data stored in the simulator generation data storage unit 132, updates based on the action condition the position of the space navigation vehicles and position of the celestial object, etc., in the circumstance situation and delivers an output to the circumstance data storage unit 131 for storage. At step S9, the simulator generation data and circumstance data are fed to the input/output processing unit 10 on the basis of the input storage configuration condition and displayed on the windows of the display unit. Here, the circumstance generation section 12 repeatedly executes circumstance generation with steps S7 to S9 as one step until an end time set by the action condition. When the end time is reached, the simulation operation is completed (step S10).

In the case where the generating electric power and internal temperature of the space navigation vehicles are simulated for instance, vehicle-to-sun distance information of the circumstance generating section 12 is input to the simulator library 14. Then the simulator library 14 calculates generated electric power and heat on the basis of the input distance information and executes the simulation of generated dissipation power and internal temperature on the basis of the available situation signals in those mount units of the space navigation vehicles which are input via the integrated control unit 11. A result of simulation by the simulator library 14 is stored in the simulator generation data storage unit 132 of the action variable storage unit 13 and a display output corresponding to the aforementioned output condition is output to the input/output processing unit 10. By so doing, the input/output processing unit 10 displays a desired result of simulation on the windows 151 of the display unit 15.

In the case where, with the aforementioned desired maneuvering operation completed, new action setting condition information is required so as to execute new maneuvering simulation, the input/output processing unit 10 is again operated and new action setting condition information is added or the level of the standard is elevated. By so doing, the action setting condition information is additively increased. Here it is thus possible to perform desired new maneuvering operation simulation in substantially the same procedure as set out above.

Thus the aforementioned simulation system is so designed that the characteristic data of the space navigation vehicle and characteristic data of the circumstance situation are set as numerical information and the action setting condition information of the space navigation vehicle is set using nonprogramming language containing symbols; the circumstance data which is an actual action variable necessary for maneuvering operation is calculated on the basis of the characteristic data and action condition setting information; and, on the basis of the circumstance data, maneuvering operation simulation is executed at the simulation library 14. According to this system, it is possible to perform substantially the same function as the system modification simply by variably setting the characteristic data and action setting condition information as storage data. It is possible to compute the circumstance data under various action setting conditions and to perform highly accurate transport simulation of the space navigation vehicle while maintaining high function.

In the case where, as the storage data, nine elements in all are involved, for example, the earth, sun, moon, three space navigation vehicles and three ground stations for tracking control, the amount of data necessary to describe the relation among these elements is represented by the permutation; $9^{P}8 = 9 \times 8 = 72$ combinations.

Further, the actual action variables on nine dimensions in all of the relative distance (1 dimension), relative position.velocity vector (3+3 dimensions) and relative azimuth.elevation angle (1+1 dimensions) corresponding to the actions of the respective elements whose positions vary constantly become $72 \times 9 = 648$ in view of the permutation being 72 combinations.

If the sunshine.eclipse, visibility.invisibility, coordinate system and time involved per each element are taken into consideration, then about 1000 variables are required. Where the variables of the respective elements are defined as set out in the present invention, even if the number of variables to be treated as numeral information becomes 648, data to be stored can be reduced to 18. In this way, the amount of data can be reduced and hence the characteristic data base 113 can be made compact, thus simplifying the operation.

Stated another way, (sun)(azimuth)(earth) variables are defined as the azimuth of the sum viewed from the earth and, for the (sun)(azimuth)(earth) variable (symbols), (azimuth) is set as characteristic data with the use of numerical information and (sun) and (earth) are set as the action setting condition information with the use of the nonprogramming language. In this manner, the variables requiring 648 variables as storage areas can be defined with 18 variables, that is, a sum of nine action setting condition information in all on the earth, sun, moon, three space navigation vehicles and three ground stations for tracking control and numerical information of those nine dimensions on the aforementioned relative distance, relative position.velocity vector and relative azimuth.elevation angle.

As noted above, all that is necessary for the user (operator) is to operate the input/output processing unit 10 and set the action setting condition information and characteristic data whereby it is possible to find intended actual action variables without modifying the system which makes the system easier to operate.

According to the present system, among the variables involved the action setting condition information is set using nonprogramming language and it is possible to secure the inheritance of information and hence to additively increase the action setting condition information as well as to enhance and additively increase the level, etc., of the standard. These can be readily and variably adjusted. It is advantageous to readily promote the enhancement of a decision-making system's sequence.

Although in the aforementioned embodiment the maneuver operation of the space navigation vehicle has been explained as being simulated, the present invention is not restricted thereto. For example, the present invention can be applied to the maneuvering operation simulation of a flying vehicle, such as an aircraft, and be so done with substantially the same effect.

Further, although in the aforementioned embodiment the result of simulation has been explained as being displayed as images on the windows 151 of the display section 15, the present invention is not restricted thereto and can be so designed as to print out a result of simulation.

The present invention is not restricted to the aforementioned embodiment and can variously be modified without departing from the spirit and scope of the present invention.

As set out above, a flying vehicle simulation system of the present invention can very accurately simulate operational maneuvering of a flying vehicle, such as a space navigation vehicle and aircraft, while maintaining a high function, thus providing a stable maneuvering operation system for flying vehicles.

I claim:

1. A flying vehicle simulation system comprising:

input/output processing means for setting first characteristics data representing the general characteristics data of a flying vehicle means, second characteristics data representing the characteristics data of a particular circumstance situation, a storage configuration condition representing a configuration for storing an actual action variable representing a general maneuvering-operation state of the flying vehicle means, a maneuvering-operation condition representing the maneuvering-operation of the flying vehicle means, and an output condition representing the maneuvering-operation of the flying vehicle means, and an output condition representing a display output of a simulation result of the flying vehicle means;

integrated control means response to the settings from the input/output processing means for defining the first and second characteristics data as numerical information and for defining the action condition, maneuvering-operation condition and an output condition as symbols containing nonprogramming language;

circumstance generating means for computing the actual action variable of the flying vehicle means on the basis of the first and second characteristic data and the action condition defined by the integrated control means, and for computing a new actual action variable in accordance with a result of simulation of the flying vehicle means based on the computed actual action variable, the first and second characteristic data defined by the integrated control means and the action condition defined by the integrated control means to sequentially update the actual action variable;

simulator means for simulating the maneuvering-operation of the flying vehicle means in accordance with a most recent actual action variable computed by the circumstance generating means, the first and second characteristics data defined by the integrated control means and the maneuvering-operation condition defined by the integrated control means; and storage means having a first storage section for storing the actual action variable which is generated by the circumstance generating means in accordance with the storage configuration condition defined by the integrated control means to be supplied to the simulator means and a second storage section for storing a result of the simulation by the simulator means to be supplied to the circumstance generating means, and the storage means for outputting the result of the simulation in the storage section to the input/output processing means in accordance with the output condition defined by the integrated control means.

2. The flying vehicle simulation system according to claim 1, wherein the input/output processing means comprises a display section for displaying the result of simulation by the simulator means.

3. The flying vehicle simulation system according to claim 2, wherein the display section comprises a plurality of windows for displaying a result of simulation each with an image of a different magnification.

4. The flying vehicle simulation system according to claim 1, wherein the integrated control means comprises means for enabling additive increase of the action condition, memory configuration condition, maneuvering-operation condition and output condition set by the input/output processing means.

5. The flying vehicle simulation system according to claim 1, wherein the flying vehicle means comprises at least two flying vehicles.

6. The flying vehicle simulation system according to claim 5, wherein the input/output processing means comprises a display section for displaying a result of simulation by the simulator means.

7. The flying vehicle simulation system according to claim 6, wherein the display section comprises a plurality of windows, each displaying the result of simulation with an image of a different magnification.

8. The flying vehicle simulation system according to claim 6, wherein the integrated control means comprises means for enabling an additive increase of the action condition, storage configuration condition, maneuvering-operation condition and output condition set by the input/output processing means.

9. The flying vehicle simulation system according to claim 6, wherein the information for the action condition set by the input/output processing means is additively increased.

10. The flying vehicle simulation system according to claim 6, wherein the action condition set by the input/output processing means is determined under at least one of the action condition, storage configuration condition and maneuvering-operation condition.

* * * * *